April 21, 1936.    R. F. RUTHRUFF    2,038,086
POLYMERIZATION OF OLEFINIC GASES
Filed Aug. 24, 1932
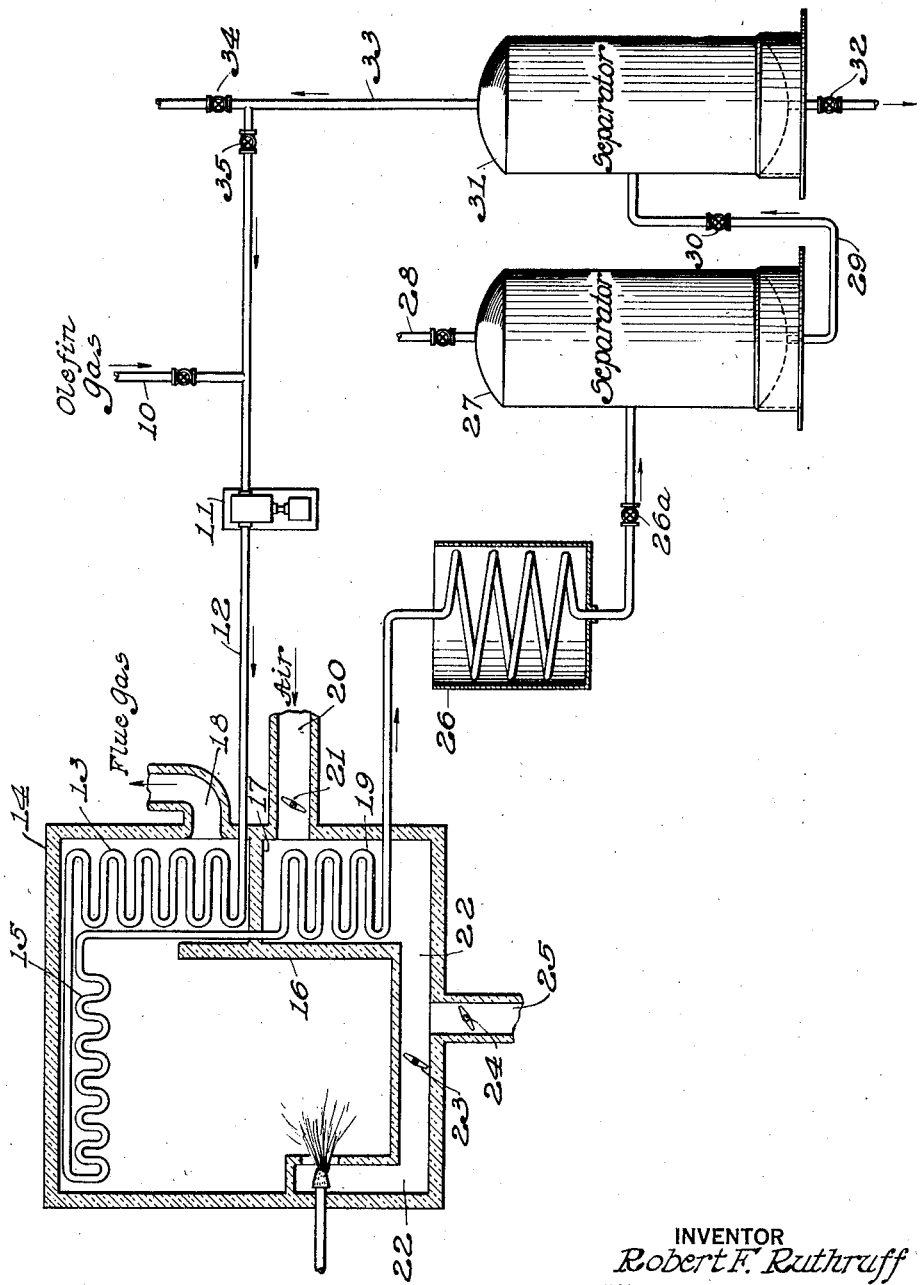
INVENTOR
Robert F. Ruthruff
BY
Bruce. K. Brown
ATTORNEY Patented Apr. 21, 1936

2,038,086

UNITED STATES PATENT OFFICE 2,038,086

POLYMERIZATION OF OLEFINIC GASES

Robert F. Ruthruff, Hammond, Ind., assignor to Standard Oil Company, Chicago, Ill., a corporation of Indiana Application August 24, 1932, Serial No. 630,281

6 Claims. (Cl. 196—10)

My invention relates to an improved system for the polymerization of olefinic gases.

It is well known that olefinic gases present in gas mixtures containing 25% or more thereof can be polymerized to liquid products at temperatures of 750–1250° F. under pressures of 500–3000 pounds per square inch. The practical large scale operation of such processes is, however, rendered difficult and even unsafe in ordinary apparatus by the fact that these high pressure polymerization reactions are strongly exothermic in character. For this reason, unless some special precautions are taken whereby conditions in the heating and reaction zone are definitely controlled within close limits, the reacting gases tend to self-heat to a point where cracking to undesired products takes place and overheating and failure of the pressure resistant walls of the system is likely to occur.

I have found that this difficulty may be avoided by heating the gases to reaction temperature with great rapidity and introducing said heated gases immediately into a coil soaking section to which no further heat is applied and which is in fact externally cooled. I have further discovered that external cooling of this coil can best be effected by means of a concurrent flow of relatively cold air external thereto. Furthermore, it is especially advantageous if the heated air from this step be utilized for combustion in the heating section of the furnace, since it is necessary to maintain especially high temperatures in said heating section in order to heat reaction gases with the desired rapidity.

Suitable apparatus for carrying out my process is shown in the drawing which forms part of this specification and which represents a diagrammatic elevational view of said apparatus.

The general operation of my improved system may be clearly understood from the following description. Referring to the drawing, olefinic gases containing more than 25% by volume of gaseous olefins, enter the system through line 10 and are compressed by pump 11 in line 12 to a pressure of 500–3000 pounds per square inch. The gases then enter the preheating coil 13 of furnace 14 and are heated in this coil to a temperature of not over 500° F. The gases then pass into the radiant heating coil 15 of furnace 14 wherein they are heated to full reaction temperature within a period of less than one minute. Heater 14 is provided with bridge wall 16 and a horizontal refractory wall 17 closes off the space between the bridge wall and the rear wall of the furnace just below the flue gas exit 18.

The heated gases from coil 15 pass into an unheated coil 19 located in the space below wall 17 and between the bridge wall and the rear wall of the furnace. Air enters the upper part of this chamber through a conduit 20 provided with damper 21 and passes downwardly therethrough and over coil 19 in concurrent flow with the gases therein. Heated air is withdrawn from this space through conduit 22 and preferably is introduced into the combustion chamber of furnace 14 through damper 23 in conduit 22. A part of the heated air may, however, be withdrawn from conduit 22 by means of damper 24 and outlet 25. The introduction of air into inlet 20 is so regulated, preferably automatically, as to maintain the temperature of gases and reaction products in coil 19 at a point within 50° F. plus or minus of the temperature of said gases entering the coil.

Gases and reaction products leaving coil 19 are cooled in cooler 26 and pass through valve 26a into high pressure separator 27 from which fixed gases may be eliminated through vent 28, liquid products and remaining gases dissolved therein being withdrawn through line 29, pressure reduced at valve 30 and introduced into separator 31 from which liquid reaction products are removed by offtake 32. Gases separated in separator 31 are withdrawn through line 33 and may be recycled to the system via valve 35 in admixture with fresh gas supplied through line 10, or may be wholly or partly eliminated thru 34.

The desired reaction time of gases in soaking and reaction section 19 lies in general between 1 and 20 minutes, depending on the concentration of the olefinic gases and upon the temperatures and pressures employed. I have found that difficulties and dangers from self-heating can be avoided if the heating time of gases in coil 15 be kept between about $\frac{1}{10}$ and about $\frac{2}{10}$ of the desired reaction time in the unheated soaking section. In order to accomplish this rapid heating, I find that it is necessary to supply furnace 14 with preheated air in order that high flue gas temperatures and high temperature gradients to the heating tubes may be maintained. In fact while I have stated that part of the air introduced at 20 may be withdrawn through offtake 25, I may even in certain cases introduce additional amounts of preheated air through conduit 25 from any convenient source The operating conditions of high-pressure separator 27 are subject to the limitation that frequently it is preferable not to operate said separator at pressures above 2,000 lbs. per square inch since at the temperatures attainable with ordinary cooling water, separation of phases is frequently not satisfactory at higher pressures than this. In case, therefore, that I make use of reaction pressures of above 2,000 lbs. I may reduce pressure to at least that point by valve 26a prior to high-pressure separator 27. It will be understood that separators 27 and 31 may either or both be equipped internally with bubble or baffle plates, heating and cooling coils, and other conventional devices to obtain improved separation therein.

Wherever I refer to "olefinic gas" herein I mean a gas mixture containing 25% or more of gaseous olefins and wherever I refer to polymerization at elevated temperatures and pressures, I mean polymerization within the range of 500–3000 lbs. and 750° to 1250° F. The foregoing being a full and complete description of my invention,

I claim:

1. In a process for the polymerization of olefinic gas at elevated temperatures and pressures, the steps of preheating said gas to a temperature below 500° F., introducing said preheated gas into a heating section of the radiant type, heating said gas therein rapidly to reaction temperatures, passing said heated gas into a soaking coil and maintaining a current of air in flow external to said soaking coil and concurrent with the flow of gases therein whereby said air is preheated, and passing said preheated air into the heating section of the furnace.

2. In a process for the polymerization of olefinic gas at elevated temperatures and pressures, the steps of preheating said gas to a temperature of less than 500°, utilizing heat liberated in a later stage of the process to preheat the air supply to a heating furnace whereby high temperatures are maintained therein, introducing said preheated gas into a heating coil located in the radiant section of said furnace, heating said gas therein rapidly to reaction temperatures, passing said heated gas into a soaking coil, maintaining a current of air in flow external to said soaking coil and concurrent with the flow of gases therein whereby said air is preheated, and passing said preheated air into the heating section of the furnace.

3. In a process for the polymerization of olefinic gas at elevated temperatures and pressures, the steps of preheating said gas to a temperature of less than 500° F., introducing said gas into a radiant type heating coil, heating said gas therein to reaction temperature within a time of contact in said radiant zone of 0.10 T to 0.20 T minutes, introducing said heated gas into an unheated soaking coil located out of contact with furnace gases, maintaining said heated gases in said soaking coil for a time of contact of T minutes while passing a current of relatively cold air externally thereto and in concurrent flow with gases therein whereby said air is preheated, and introducing said preheated air into the combustion chamber of aforesaid furnace.

4. In a process for the polymerization of olefinic gas at elevated temperatures and pressures, the steps of preheating said gas to a temperature below 500° F., introducing said preheated gas into a confined zone in a heating section of a furnace, heating said gas therein rapidly to reaction temperature, and passing said heated gas into an unheated soaking zone maintained out of contact with flue gases from the heating furnace, passing a continuous current of oxygen containing gas in indirect heat exchange relation with the heated gas passing through said unheated soaking zone to thereby regulate the temperature of heated gas and increase the temperature of said oxygen containing gas, and utilizing said current of oxygen containing gas at the increased temperature for combustion purposes to effect a rapid rise in temperature of the olefinic gas being heated in the heating section of the furnace.

5. In a process for the polymerization of olefinic gas at elevated temperatures and pressures, the steps of preheating said gas, introducing said preheated gas into a confined zone in a heating section of a furnace, heating said gas therein rapidly to reaction temperatures, passing said heated gas into a soaking zone and maintaining a current of air in flow external to said soaking zone whereby said air is preheated, and passing said preheated air into the heating section of the furnace.

6. In a process for the polymerization of olefinic gas at elevated temperatures and pressures, the steps of introducing said gas into a confined zone of a heating section of a furnace, heating said gas therein rapidly to reaction temperature, passing said heated gas into a soaking zone and maintaining a current of air in flow external to said soaking zone whereby said air is preheated, and passing said preheated air into the heating section of the furnace.

ROBERT F. RUTHRUFF.